(12) United States Patent
Fandre et al.

(10) Patent No.: US 8,721,188 B2
(45) Date of Patent: May 13, 2014

(54) CAGE FOR A ROLLING ELEMENT BEARING AND METHOD FOR THE PRODUCTION THEREOF

(75) Inventors: Hans-Juergen Fandre, Oerlenbach (DE); Alexander Tietz, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 589 days.

(21) Appl. No.: 12/745,332

(22) PCT Filed: Nov. 12, 2008

(86) PCT No.: PCT/DE2008/001865
§ 371 (c)(1),
(2), (4) Date: May 28, 2010

(87) PCT Pub. No.: WO2009/067980
PCT Pub. Date: Jun. 4, 2009

(65) Prior Publication Data
US 2010/0310203 A1 Dec. 9, 2010

(30) Foreign Application Priority Data

Nov. 29, 2007 (DE) .......................... 10 2007 057 550

(51) Int. Cl.
*F16C 33/48* (2006.01)
*F16C 33/54* (2006.01)
*F16C 33/56* (2006.01)

(52) U.S. Cl.
USPC ............ 384/572; 384/575; 384/576; 384/580

(58) Field of Classification Search
USPC ................ 384/572, 470, 560, 575, 576, 580; 29/898.065, 898.067, 557
See application file for complete search history.

(56) References Cited

U.S. PATENT DOCUMENTS

| 6,132,102 | A  * | 10/2000 | Bessone et al. | ............... 384/576 |
| 6,955,476 | B1 * | 10/2005 | Murai | ............ 384/580 |
| 7,670,058 | B2 * | 3/2010 | Schorr et al. | .................. 384/580 |
| 8,123,414 | B2 * | 2/2012 | Tsujimoto | ..................... 384/580 |
| 2003/0068110 | A1 * | 4/2003 | Matsui et al. | ................ 384/572 |

FOREIGN PATENT DOCUMENTS

| DE | 10 2006 006146 Y | 10/2007 |
| EP | 1 803 952 | 7/2007 |
| JP | 09 177793 | 7/1997 |
| JP | 2004 340266 Y | 12/2004 |

* cited by examiner

*Primary Examiner* — Thomas R Hannon
*Assistant Examiner* — Adam D Rogers
(74) *Attorney, Agent, or Firm* — Lucas & Mercanti, LLP

(57) ABSTRACT

A cage for a rolling element bearing and a method for the production thereof. The cage has either an increased number of rolling elements or improved load-bearing capacity. A The cage has a plurality of cage pockets for receiving the rolling elements, two side rings and a plurality of cross-ribs. The cross-ribs connect the side rings such that the cage pockets are formed. The cage pockets have milled-out or drilled-out corner regions. hereinafter collectively referred to as milled-out corner regions, The corner regions, in a cutting plane perpendicular to the axis of rotation of the cage, have a radial milling course in the direction of the axis of rotations. The milling course, at least in a partial section, is configured at an incline with respect to a radial vector placed through the partial section and the axis of rotation, and is configured at an incline in the direction of the cage pocket.

9 Claims, 6 Drawing Sheets

A-A

CAGE FOR A ROLLING ELEMENT BEARING AND METHOD FOR THE PRODUCTION THEREOF

This application is a 371 of PCT/de2008/001865 filed Nov. 12, 2008, which in turn claims the priority of DE 10 2007 057 550.7 filed Nov. 29, 2007, the priority of both applications is hereby claimed and both applications are incorporated by reference herein.

FIELD OF THE INVENTION

The invention relates to a cage for a rolling element bearing with a plurality of cage pockets for accommodating the rolling elements, with two side rings and a plurality of crosspieces, the crosspieces connecting the side rings in such a way as to form the cage pockets, the cage pockets comprising milled-out or drilled-out corner regions, hereinafter collectively referred to as milled-out corner regions, and the corner regions, in a section plane perpendicular to the axis of rotation of the cage, comprising a radial milling profile in the direction of the axis of rotation which at least in a subportion is inclined relative to a radial vector passing through the subportion and the axis of rotation, together with a method for the production thereof.

Cages for rolling element bearings are used to guide the rolling elements when in operation and to keep them spaced from one another. One possible cage construction is the so-called "solid cage", which is of one-piece construction. The production of solid cages conventionally involves broaching, drilling out or milling out the cage pockets in a main cage body. The cage pockets often take the form of rectangular, square or trapezoidal windows in the cage.

Document DE 10 2006 006 146 B3 for example, which would seem to constitute the closest prior art, discloses a method of producing a solid cage for a rolling bearing and a rolling bearing cage. The method involves firstly introducing a number of rolling element receiving pockets, which are quadrilateral when viewed in the radial direction, in a first milling process into a main cage body and then producing recesses for the rolling elements in the corners of the quadrilateral receiving pocket contour using a drilling or milling tool. With the aim of enlarging the linking surface between crosspiece and cage ring, said document proposes guiding the drilling or milling tool such that a curved milling profile is produced in the corner regions in a cross-sectional plane perpendicular to the axis of rotation of the rolling bearing cage.

The object of the invention is to propose a cage for a rolling element bearing and a method for the production thereof, the cage being distinguished either by an increased number of rolling elements or by an improved load carrying capacity.

This object is achieved with a cage having the features of claim 1 and with a method having the features of claim 10. Preferred or advantageous embodiments of the invention are disclosed by the subclaims, the following description and the attached figures.

The cage is suitable and/or configured for a rolling element bearing, wherein the rolling element bearing may take the form for example of a tapered, spherical, cylindrical or self-aligning roller bearing. The rolling element bearing is preferably provided as a railway bearing for use in transmissions or wheel bearings for rail vehicles or in other in particular rapidly rotating roller bearings. The cage has two side rings or disks and a plurality of crosspieces, the crosspieces connecting the side rings in such a way that cage pockets are formed for accommodating rolling elements of the rolling element bearing. The basic shape of the cage pockets is quadrilateral and may, depending on the type of rolling element, be square, trapezoidal or rectangular.

The cage pockets comprise corner regions in the corners of the quadrilateral structure, which corner regions are introduced by milling or drilling into the main cage body. To simplify the description, drilling and milling are referred to collectively below just as milling, milled, milling process etc., the invention nonetheless also covering cages with drilled corner regions.

For the purpose of the description, a section plane is defined which is perpendicular to the axis of rotation of the cage and runs through the corner regions arranged on a common axial side of the cage. In this section plane the corner regions have a radially oriented milling profile, which is directed from radially outside to radially inside. At least in a subportion of the milling profile, the latter is inclined relative to a radial vector, the radial vector running through the stated subportion and the axis of rotation in the section plane.

The subportion may in this case take the form of a straight or curved subportion.

It is proposed for the purposes of the invention for the milling profile to be inclined in the subportion relative to the radial vector in the direction of the openly adjacent cage pocket or the cage pocket to which the corner region belongs. The milling profile extends for example from radially outside towards the axis of rotation, crossing the radial vector in the process, and continues on the side of the adjacent cage pocket.

In other words, the milling profile is such that relative to the radial vector material of the main cage body remains radially on the inside in the region of the adjacent cage pocket and in this way an increased linking cross section between crosspiece and side ring is achieved, together with greater crosspiece stability.

It is a consideration of the invention that although in the known prior art care is taken to reinforce the linking cross section between crosspiece and side ring in a radially outer region, no attention is paid to the radially inner region. It is accordingly proposed for the purposes of the invention to enlarge the cross section of the crosspieces in the radially inner region by the structural measure described. The load carrying characteristic of the cage, which is improved by said structural measure, may on the one hand be utilized to improve the load carrying capacity of a cage with the same number of rolling elements or to increase the number of cage pockets in a cage while maintaining its load carrying capacity.

In a preferred embodiment of the invention, the cage takes the form of a solid cage, in particular a brass cage. The solid cage is in particular of one-piece construction.

In a first alternative of the invention the entire milling profile is inclined in the corner region in the direction of the cage pocket. In particular, the milling profile may take the form of a straight portion, which is simple to manufacture, as is explained in greater detail below in relation to the method according to the invention.

In another alternative embodiment of the invention, the subportion takes the form of a radially inner end portion of the milling profile. In this alternative the invention focuses on improving load carrying capacity in the radially inner region, whereas the initial portion, radially to the outside thereof, may be of any desired configuration.

For manufacturing reasons, it is preferable for the subportion to exhibit a constant inclination, but in alternative embodiments it is also possible for the subportion to be curved.

In a further development of the invention, the initial portion, arranged relative to the radially inner end portion, of the milling profile is oriented parallel to a first central vector extending in the section plane and through the middle of the cage pocket and the axis of rotation. This configuration has the advantage, as regards manufacturing, that the cage pocket to be machined may be positioned with regard to its centre and the milling operations may then be performed with a linear and/or straight movement.

In an alternative further development of the invention, the milling profile in the above-described initial portion is oriented parallel to a second central vector extending in the section plane and through the initial portion and the axis of rotation. In this embodiment the milling process thus takes place precisely in the radial direction.

In a preferred embodiment of the invention, the subportion or end portion extends over at least 10%, preferably at least 20% and in particular over at least 30% and/or over at most 90%, preferably at most 80% and in particular at most 70% of the radial extent of the milling profile along the radial vector.

In one possible structural embodiment, the crosspieces are configured at least in the region of the subportion in the section plane described further above with a width which is constant or even becomes larger in the direction of the axis of rotation. This shape is ultimately the result of the design according to the invention of the milling profile.

The present invention also provides a method of producing the above-described cage or according to one of the preceding claims, the milled corner regions being introduced into a main cage body by means of a milling tool.

In one possible configuration of the invention, the guiding direction of the milling tool is inclined in the direction of the axis of rotation relative to the above-described radial vector in the above-described manner towards the cage pocket, which is machined straight. The milling tool is thus deliberately guided at an angle to the radial vector, such that the cross section of the crosspieces is broadened in the radially inner region over the prior art. In particular, the milling tool takes the form of a straight milling cutter or of a milling tool with a cylindrical working face, which generates the milling profile in the cage.

In a preferred alternative of the invention, the milling tool comprises a converging, tapering and/or conical tool portion, the tool portion being configured to generate the subportion or end portion in the main cage body. In this alternative the milling tool may in principle be guided parallel to the radial vector or to the central vector.

In a further preferred development of the invention, however, this milling tool is also positioned in the described way relative to the radial vector, in order to obtain a wider crosspiece end portion as a result both of the tool shape and the tool guidance.

Further features, advantages and effects of the invention are revealed by the following description of preferred exemplary embodiments. In the figures.

Mutually corresponding parts or regions are provided in each case with the same reference numerals.

Figure 1:
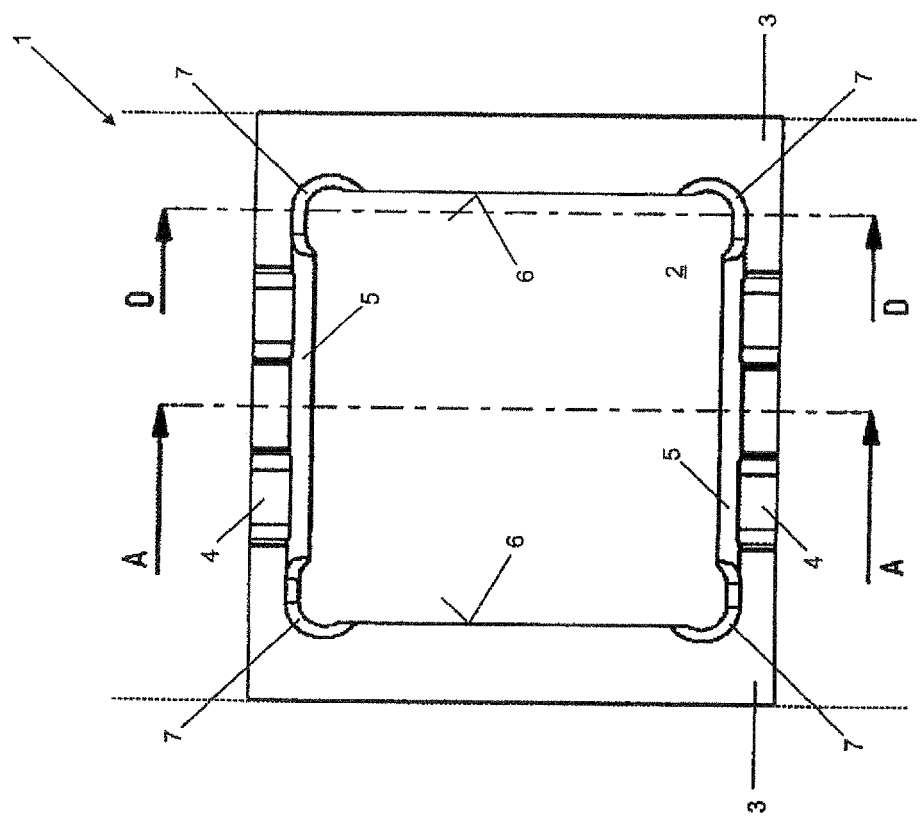
FIG. 1 shows a schematic plan view of a portion of a cage in the region of a cage pocket, as a first exemplary embodiment of the invention.

FIG. 1 shows a schematic plan view of a portion of a cage 1 in the region of a cage pocket 2, as a first exemplary embodiment of the invention. The cage 1 takes the form of a solid brass cage, for example for a railway rolling bearing. The cage 1 is made in one piece and has side rings 3 at the edges, which are connected via crosspieces 4, such that the cage pockets 2 are enclosed.

The cage pocket 2 has a substantially quadrilateral or square outline and in the region of the crosspieces 4 displays running surfaces 5 for the rolling elements, in particular for cylindrical rollers (not shown), with side walls 6 as axial boundaries. The corner regions 7 of the cage pocket are formed by milling out a main cage body and extend between the running regions 5 and the side walls 6. In the illustration in FIG. 1, the corner regions 7 are configured in plan view as segments of circles and are optionally extended tangentially in the direction of the running surfaces 5 or side walls 6.

Figure 2:
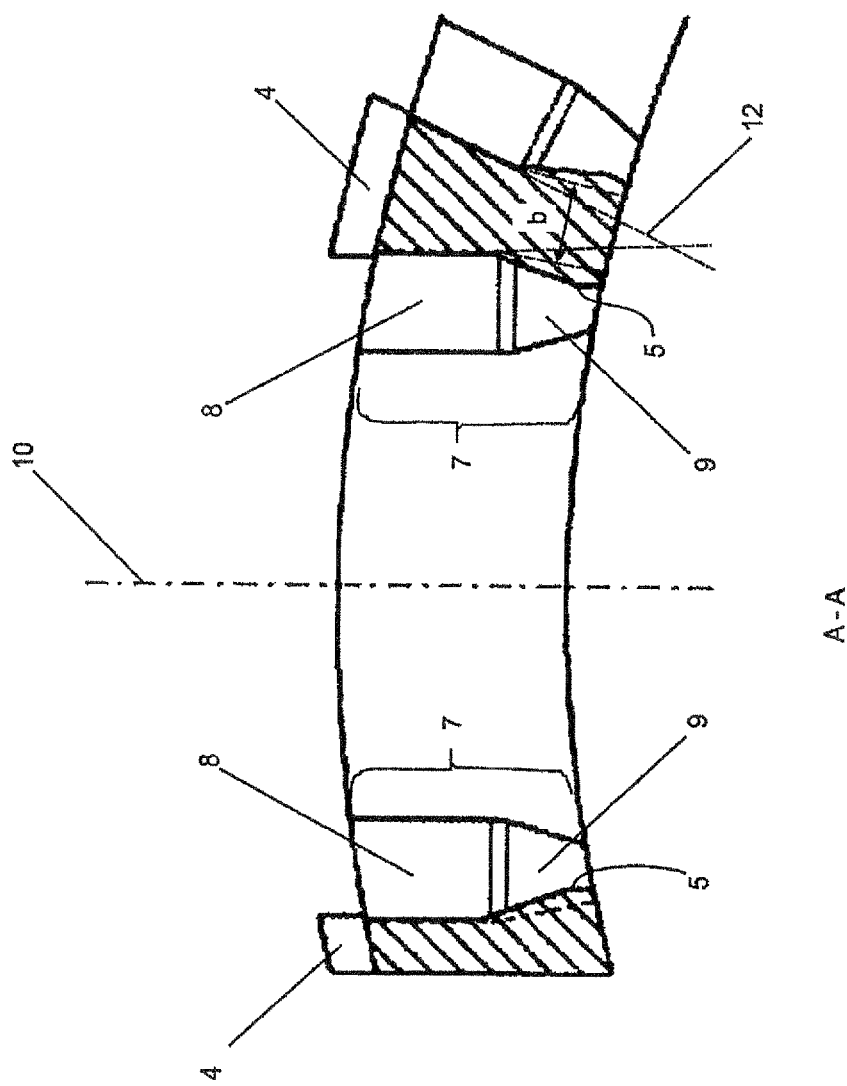
FIG. 2 shows a detail of the cage pocket of FIG. 1 along section line A-A.

FIG. 2 is a schematic representation of a schematic cross section along cross section line A-A in FIG. 1, the crosspieces 4 with the running regions 5 once again being visible. As is clear from FIG. 2, the corner regions 7 are formed of a cylindrical initial portion 8 and an adjacent conically tapering end portion 9, which is open radially on the inside. The cylindrical initial portion 8 is oriented parallel to a first central vector 10, which passes through the centre of the cage pocket 2 and through the axis of rotation (not shown) of the cage 1.

During manufacture the cage 1 may be simply oriented and the corner regions 7 of a cage pocket 2 formed for example by simultaneous milling, the milling direction being oriented parallel to the first central vector 10. The end portion 9, on the other hand, as is also clear from FIG. 3, which shows a schematic cross section along section line D-D, is configured with the milling profile 11 at an angle relative to the milling profile 11 in the region of the initial portion 8. This angling makes it possible for the width b of the crosspiece 4 to remain larger in the radially inner region than if the end portion 9 is also milled into the main cage body as a continuation of the initial portion 8. For machining, a milling tool with a conically tapering milling cutter is used, for example, such that initial portion 8 and end portion 9 may be introduced time—and thus cost—effectively in the same milling process. As a comparison, in FIG. 2 the profile of the initial portion 8 is extended by dashed lines 12, to illustrate the widening in the base area of the crosspiece 4 when a conical milling cutter is used.

Figure 3:
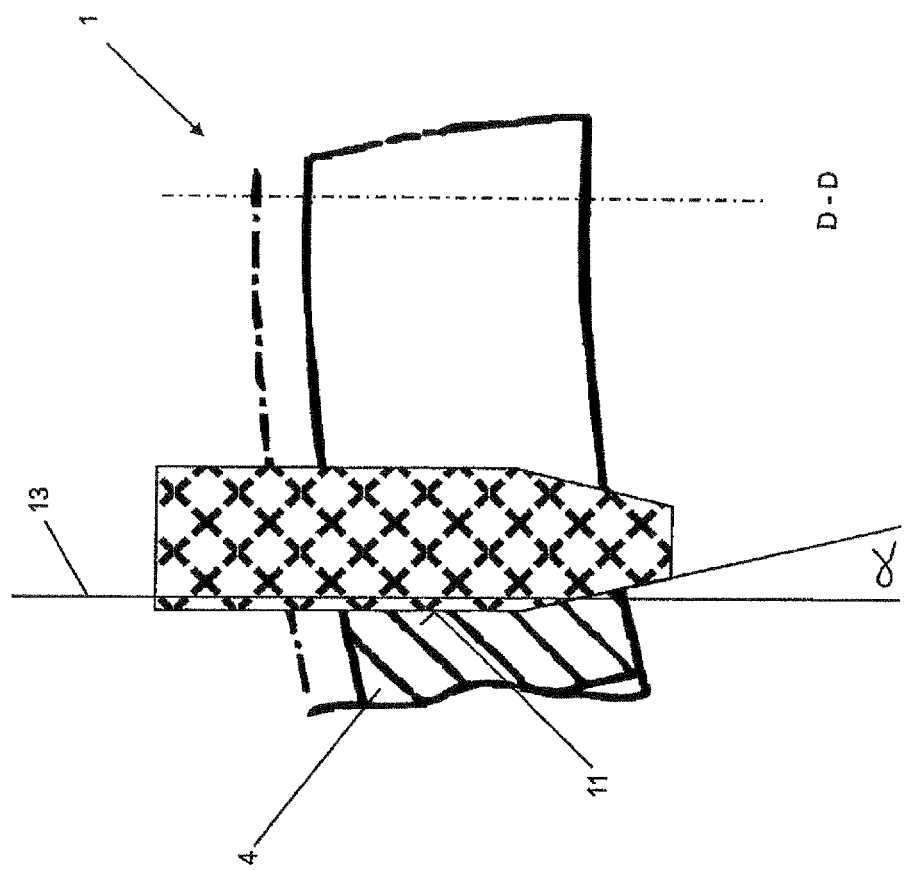
FIG. 3 shows a further detail of the cage pocket of FIG. 1 along section line D-D.

The milling profile 11 in the end portion 9 is here inclined such that it is inclined relative to a radial vector 13, which extends through the axis of rotation of the cage 1 and in the end portion 9 at any desired point, in the direction of the axis of rotation towards the cage pocket 2, which is shown in FIG. 3 by the angle α.

Figure 4:
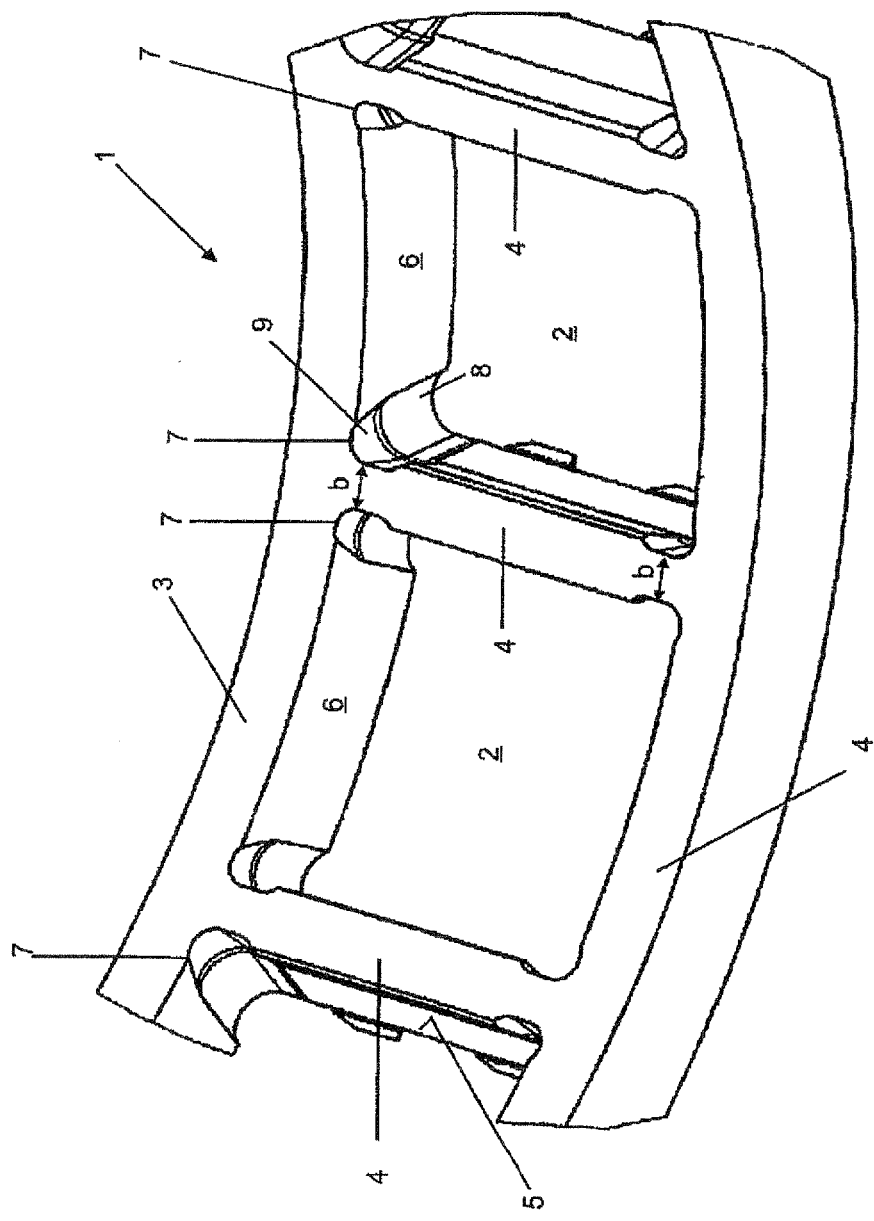
FIG. 4 shows a schematic three dimensional representation from radially inside onto the cage of FIG. 1.

FIG. 4 shows the cage of FIG. 1 in a schematic, three dimensional representation in a view from radially inside, two cage pockets 2 being shown, which are arranged adjacent to one another by way of a common crosspiece 4. By way of the selected milling profile 11 of the corner regions 7, the initial portion 8 and the end portion 9 are configured such that the width of the crosspiece 4 is significantly wider in the region of the corner regions 7 than for example in the case of dashed line 12 in FIG. 2.

As a result of this widening of the crosspieces 4 in the radially inner region of the cage 1, on the one hand an improved link between the crosspieces 4 and the side rings 3 is achieved and on the other hand an improvement in the load carrying capacity of the crosspieces 4 themselves is achieved.

Figure 5:
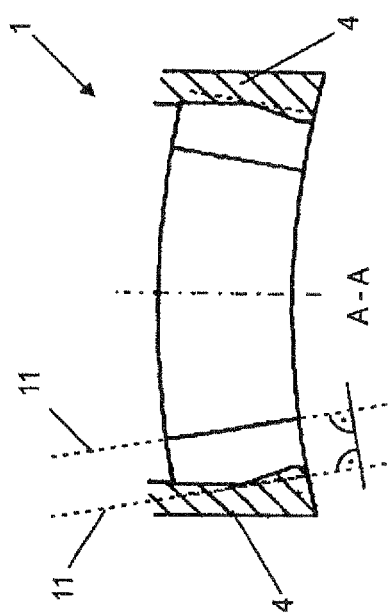
FIG. 5 shows a further exemplary embodiment of the invention in the same view as in FIG. 2.

FIG. 5 shows a second exemplary embodiment of the invention in the same view as in FIG. 2, wherein instead of a conical milling cutter a cylindrical or a straight milling cutter was used, which however was guided inclined by the angle alpha (α) relative to the radial vector 13 in the same way as the end portion 9 in FIGS. 1 to 4.

Figure 6:
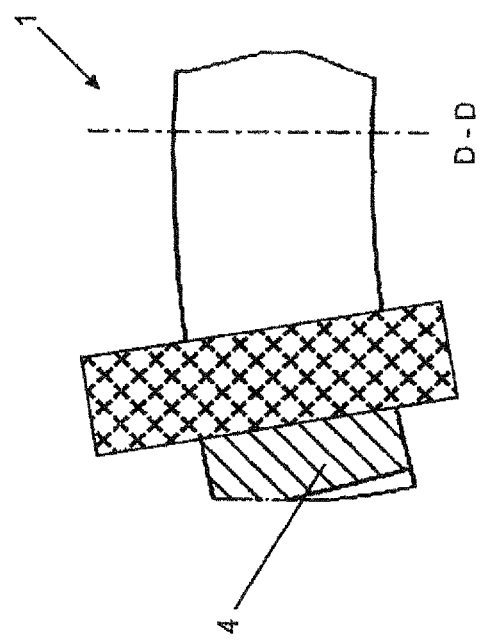
FIG. 6 shows the second exemplary embodiment of FIG. 5 viewed as in FIG. 3.

FIG. 6 shows in the same view as in FIG. 3 how the straight milling cutter is guided. This embodiment of the invention also ensures that the width b radially on the inside at the corner regions 7 of the crosspieces 4 is significantly enlarged relative to the width achievable with a straight milling cutter guided parallel to the central vector 10 or the radial vector.

Figure 7:
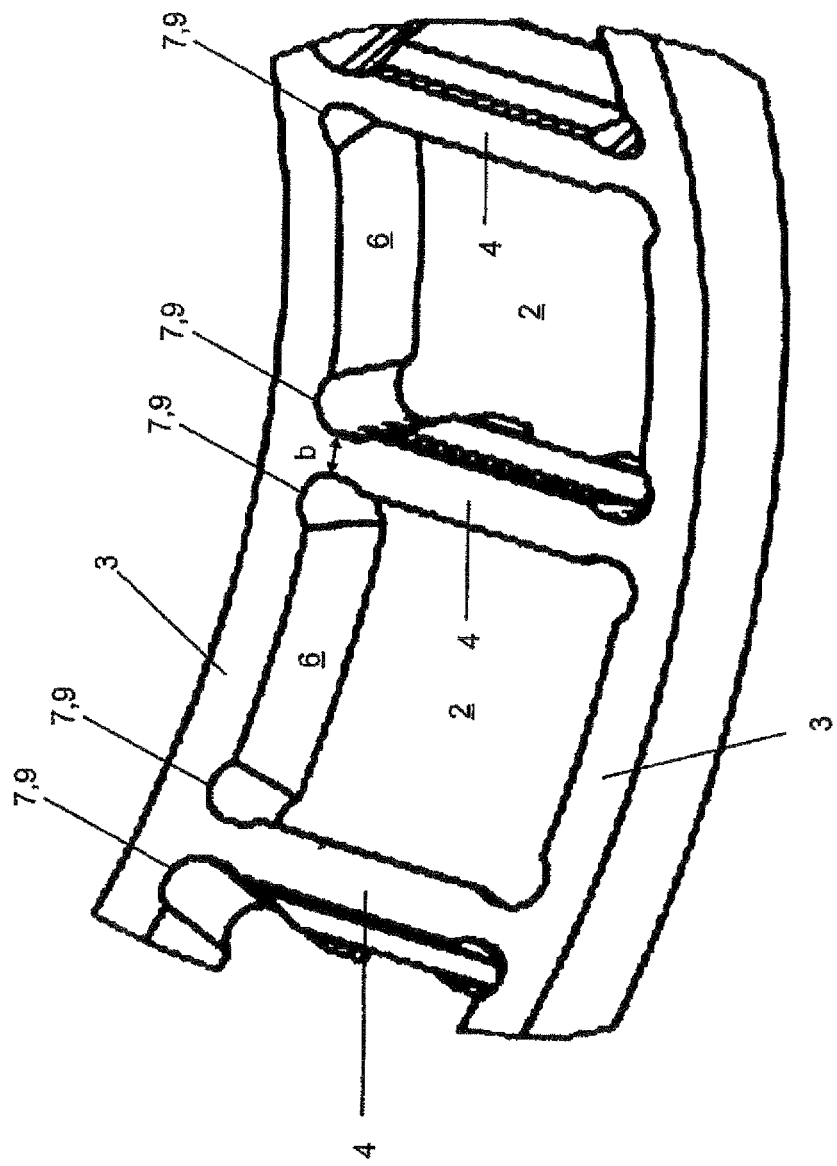
FIG. 7 shows the exemplary embodiment of FIG. 5 or 6 viewed as in FIG. 4.

FIG. 7 shows the cage 1 of the second exemplary embodiment in the same view as in FIG. 1, but with corner regions 7 machined according to FIGS. 5 and 6. It is also possible to combine the two embodiments of the invention and to use a milling cutter according to the first exemplary embodiment with a portion converging in diameter in the direction of the axis of rotation of the cage 1 and to incline the direction in which it is guided according to the second exemplary embodiment.

LIST OF REFERENCE NUMERALS

1 Cage
2 Cage pocket
3 Side ring
4 Crosspiece
5 Running surface
6 Side walls
7 Corner region
8 Initial portion
9 End portion
10 Central vector
11 Milling profile
12 Dashed line
13 Radial vector

The invention claimed is:

1. A cage for a rolling element bearing, comprising:
   a plurality of cage pockets for accommodating the rolling elements;
   two side rings; and
   a plurality of crosspieces, the crosspieces connecting the side rings in such a way as to form the cage pockets, the cage pockets having milled-out or drilled-out corner regions, the corner regions, in a section plane perpendicular to an axis of rotation of the cage, having a radial milling profile in a direction of the axis of rotation which at least in a subportion is inclined relative to a radial vector passing through the subportion and the axis of rotation,
   wherein in the subportion the milling profile is inclined in a direction of the cage pocket,
   wherein the subportion is arranged in a conically tapering end portion of the corner regions, and
   wherein the subportion is a radially inner end portion and the cornering regions include a cylindrical portion adjacent to the conically tapering end portion.

2. The cage of claim 1, wherein the cage is a solid cage.

3. The cage of claim 1, wherein the subportion has a constant inclination.

4. The cage of claim 1, wherein an initial portion of the milling profile is oriented parallel to a first central vector extending in the section plane through a middle of the cage pocket and the axis of rotation.

5. The cage of claim 1, wherein the subportion or the end portion extends over at least 10% of the radial extent of the milling profile along the radial vector.

6. The cage of claim 1, wherein at least in a region of the subportion, in the section plane, the crosspiece has a width which is constant or increases in a radial direction toward the axis of rotation.

7. A method of producing the cage of claim 1, the method comprising the steps of:
   a milling or drilling process, the milled corner region being introduced into a main cage body by a milling tool,
   wherein the milling tool has a converging, tapering or conical end portion configured to generate the subportion of the corner region.

8. The method of claim 7, wherein the milling tool has a cylindrical working face adjacent to the converging, tapering or conical end portion.

9. The cage of claim 1, wherein the cylindrical portion is oriented parallel to a first central vector that passes through a center of the cage pocket.

\* \* \* \* \*